United States Patent [19]

Sung et al.

[11] Patent Number: 5,219,955
[45] Date of Patent: Jun. 15, 1993

[54] COMPOSITION OF MATTER FOR ENCAPSULATION OF S-TRIAZINES USING POLY(1-HYDROXYL-(2,6-PHENYLENE METHYLENES)) FOR THERMAL STABILITY ENHANCEMENT AND DISSOLUTION IN DIESEL FUEL

[75] Inventors: Rodney L. Sung, Fishkill, N.Y.; Thomas F. DeRosa, Passaic, N.J.; Benjamin J. Kaufman, Hopewell Jct., N.Y.

[73] Assignee: Texaco Inc., White Plains, N.Y.

[21] Appl. No.: 848,468

[22] Filed: Mar. 9, 1992

[51] Int. Cl.$^5$ ............................................. C08G 14/09
[52] U.S. Cl. ................................... 525/516; 525/515; 525/534; 423/235; 44/336
[58] Field of Search ............... 525/515, 516, 517, 509, 525/534, 540; 423/235; 44/329, 333, 335, 336, 412, 459

[56] References Cited

U.S. PATENT DOCUMENTS

| | | | |
|---|---|---|---|
| 4,731,231 | 3/1988 | Perry | 423/235 |
| 4,803,059 | 2/1989 | Sullivan et al. | 423/235 |
| 4,861,567 | 8/1989 | Heap et al. | 423/235 |
| 4,863,705 | 9/1989 | Epperly et al. | 423/235 |
| 4,877,590 | 10/1989 | Epperly et al. | 423/235 |
| 4,877,591 | 10/1989 | Epperly et al. | 423/235 |
| 4,886,650 | 12/1989 | Perry | 423/235 |
| 4,908,193 | 3/1990 | Perry | 423/235 |
| 4,908,194 | 3/1990 | Hooper | 423/235 |

*Primary Examiner*—James J. Seidleck
*Assistant Examiner*—Mark L. Warzel
*Attorney, Agent, or Firm*—James J. O'Loughlin; Vincent A. Mallare

[57] ABSTRACT

A composition of matter comprising a mixture of:
a) 1-(poly[1-hydroxyl-(2,6-phenylene methylene)])-3,5-dihydroxy-s-triazine;
b) cyclo-1,3-(poly[1-hydroxyl-2,6-phenylenemethylene)])-5-hydroxy-s-triazine;
c) [1-(phenoxy)-3-(phenoxy')-5-hydroxy-s-triazine-]poly[1-hydroxyl-(2,6-phenylene methylene)];
d) a ladder polymer containing randomly interdispersed s-triazine 'steps'; and
e) a star polymer containing randomly interdispersed s-triazine connector sites for poly[1-hydroxyl-(2,6-phenylene methylene)] groups but where one or more pendant hydroxyl-s-triazine functions are also present.

2 Claims, No Drawings

COMPOSITION OF MATTER FOR ENCAPSULATION OF S-TRIAZINES USING POLY(1-HYDROXYL-(2,6-PHENYLENE METHYLENES)) FOR THERMAL STABILITY ENHANCEMENT AND DISSOLUTION IN DIESEL FUEL

BACKGROUND OF THE INVENTION

This invention relates to a chemical method of decreasing nitric oxide, NOx, levels, and more particularly to a composition of matter for reducing $NO_x$ levels in diesel fuels.

Nitrogen oxides are the oxidation products of elemental nitrogen, organic, or inorganic nitrogen and oxygen at elevated temperatures. Nitrogen oxides include nitric oxide, NO; nitrogen dioxide, $NO_2$; nitrogen trioxide, $NO_3$; dinitrogen trioxide, $N_2O_3$; tetranitrogen pentaoxide, $N_4O_5$; tetranitrogen hexaoxide, $N_4O_6$; nitrous oxide, $N_2O$; and the like. Elevated temperatures required to prepare these oxidation products are routinely obtained in internal combustion engines utilizing gasoline, diesel, or aviation fuel.

There are very strong ecological and environmental reasons to reduce or ideally eliminate NOx as an internal combustion oxidation product. Once produced, NOx is directly responsible for acid rain and photochemical smog. Moreover, chronic exposure to NOx has been directly linked with restricted pulmonary compliance in non-smoking healthy males; acute respiratory disease among children living in "high exposure" towns in Czechoslovakia; and a key irritant cited for the high incidence of chronic bronchitis among Japanese postal workers servicing urban centers as outlined in Medical and Biologic Effects of Environmental Pollutants by the National Academy of Sciences, 1977.

Numerous physical methods have been suggested to reduce or eliminate NOx. Certain proposed techniques involve a great deal of capital outlay and require major consumption of additives, scrubbers, etc. For example, U.S. Pat. No. 3,894,141 proposes a reaction with liquid hydrocarbons; U.S. Pat. No. 4,405,587 proposes high temperature burning with a hydrocarbon; U.S. Pat. No. 4,448,899 proposes reacting with an iron chelate; U.S. Pat. No. 3,262,751 reacts NOx with a conjugated diolefin. U.S. Pat. No. 3,900,554 utilizes a combination of ammonia and oxygen to react with nitric oxide.

Application of these reactions discussed above imposes organic pollutant disposal problems along with the attendant problems of toxicity and malodorous environments. In addition, they require the presence of oxygen and are relatively expensive. And, all of these methods discussed must deal with the problem of the odor of ammonia and its disposal. Moreover, these methods also suffer from the drawback of requiring controlled environments which make them impossible to use in mobile vehicles.

Thus, an object of the present invention is to provide an economical means and/or a composition of matter that effectively reduce $NO_x$ in diesel fuels.

DISCLOSURE STATEMENT

U.S. Pat. No. 4,731,231 discloses a method of reducing NOx levels for stationary sources of NOx. such as power plants utilizing fossil fuel to generate power. However, this invention is limited to stationary $NO_x$ sources only. This invention is not applicable to dynamic or non-stationary $NO_x$ sources, for example, gasoline or diesel powered vehicles, which means that a method for $NO_x$ reduction was not achieved.

Japanese Publication No. J55051-420 utilizes halocyanuric acid to remove malodorous fumes, e.g., mercaptans, sulfides, disulfides, ammonia or amines from gases by contact therewith followed by contact with activated carbon. Temperatures are reported in this publication as less than 80° C.; and classical acid/-base interactions appear to be involved (not pyrolysis decomposition products of the halocyanuric acid).

Back et al., Can. J. Chem. 46.531(1968), discloses the effect of nitric oxide on the photolysis of isocyanic acid, HNCO, the decomposition product of cyanuric acid. An increase of nitrogen concentration in the presence of large amounts of nitric oxide was observed when nitric oxide came in contact with isocyanic acid or the photolysis product of HNCO. The increased concentration of nitrogen was attributed by the authors directly to nitric oxide reduction NO levels.

Furthermore, use of cyanuric acid as a source of isocyanic acid (HNCO) for purposes of studying various properties of the latter or its subsequent degradation products is well known in the art. See, for example, Okable, J. Chem. Phys., 53, 3507 (1970) and Perry, J. Chem. Phys. 82,5485 (1985). However, it was never suggested therein that cyanuric acid could be useful in the removal of nitric oxides from nonstationary sources because of inherent problem in the use of cyanuric acid.

SUMMARY OF THE INVENTION

The present invention provides a composition of matter comprising a mixture of:

a) 1-(poly[l-hydroxyl-(2,6-phenylene methylene)])-3,5-dihydroxy-s-triazine;
b) cyclo-1,3 -(poly[1-hydroxyl-2,6-phenylene methylene)])-5-hydroxy-s-triazine;
c) {1-(phenoxy)-3-(phenoxy')-5-hydroxy-s-triazine} poly [1-hydroxyl-(2,6-phenylene methylene)];
d) ladder polymers containing randomly interdispersed s-triazine 'steps'; and
e) star polymers containing randomly interdispersed s-triazine connector sites for poly[1-hydroxyl-(2,6-phenylene methylene)] groups but where one or more pendant hydroxyl-s-triazine functions are also present.

DETAILED DISCUSSION OF THE INVENTION

The composition of matter of this invention is directed to two crucial areas of solubilization of cyanuric acid, or hydroxyl-s-triazine, in diesel fuel; and the thermal enhancement of the same in order to survive the internal engine combustion event.

Thus, the main areas to which the present invention is directed to are: (1) the known reducing strength of isocyanic acid, HNCO; (2) its preparation by thermally decomposing cyanuric acid, (HNCO):; (3) dissolution of cyanuric acid in diesel fuel; (4) dissolution of cyanuric acid or its derivatives that, upon thermal decomposition, generates the reducing agent, isocyanic acid, HNCO; and (5) thermally enhancing or permitting the crucial reducing agent precursor, cyanuric acid or its derivatives, to survive the internal engine combustion event.

The present composition of matter invention provides a mixture of materials addressing the aforementioned concerns. Broadly speaking, these materials may be categorized as either Oligomeric Category I, or Polymeric, Category II. Oligomeric materials are those materials containing the poly[1-hydroxyl(2,6-phenylene methylene)] linear repeat unit, represented by formula (I) below:

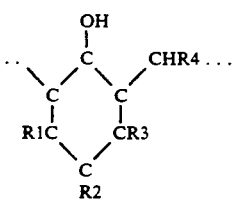
(I)

Firstly, poly[1-hydroxyl- (2,6-phenylene methylenes)] may be more aptly referred to as flexible or non-rigid calix[8]arenes. The thermodynamic driving force of poly[1-hydroxyl-(2,6-phenylene methylenes)] to cycloize is intramolecular hydrogen bonding. This hydrogen bonding characteristic has been exploited in this composition of matter invention to cycloize or 'encapsulate' the NOx reducing agent precursor, cyanuric acid. Moreover, the selection of substituents on poly[1-hydroxyl-(2,6-phenylene methylene)] are designed to both dissolve the encapsulated s-triazine containing one or more free hydroxyl groups in diesel fuel and to enhance the over all thermal stability. Randomly interdispersed along a single oligomeric unit of poly[1-hydroxyl-(2,6-phenylene methylene)] oligomeric unit are cyanuric acid mono- and di-hydroxyl s-triazine units. Whenever, this occurs, independently of whether the poly[1-hydroxy-(2,6-phenylene methylene)] in cycloized or linear, the term 'partial encapsulation' in used. A more complete disclosure is provided below. A crucial chemical requirement of cyanuric acid or hydroxyl-s-triazine incorporation is that at least one, and preferably two, free hydroxyl groups must be present. The chemical underpinning for this requirement is that upon thermal unzipping free hydroxyl groups on s-triazine will generate the NOx reducing agent, isocyanic acid. Depicted below in Equations 1a, 1b, 1c and 1d are four poly[1-hydroxyl-(2,6-phenylene methylene)] encapsulation versions for hydroxyl-s-triazines undergoing thermal decomposition.

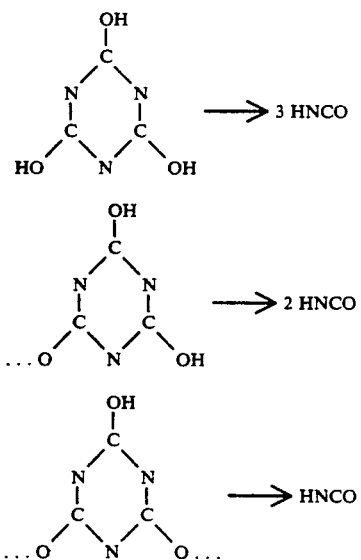

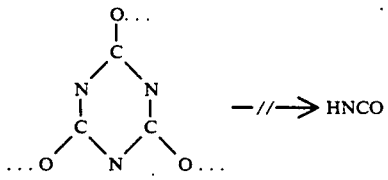

One or two covalent ether bonds attach s-triazine to the phenolic portion of the single oligomeric backbone. Polymeric materials are those materials containing linear (ladder) or star repeat units. These complex repeat units are obtained upon condensation of more than one unit apiece of either hydroxyl-s-triazine and poly[1-hydroxyl-(2,6-phenylene methylene)]. Although examples from each category are provided below, it must be noted that infinite structural permutations of these materials are possible. It should be emphasized, however, that in a typical reaction, a mixture of products will be generated. By skillful manipulation of experimental parameters, however, one or more structural orientations may be favored at the expense of another.

Below, in naming the Category I and Category II compounds (i.e., the oligomeric and polymeric repeating units) numerals (e.g., II, etc.) are provided after some, and, the corresponding structures for such compounds are provided

Category I

Oligomeric Repeating Units a) 1-(poly[1-hydroxyl-(2,6-phenylene methylene)])-3,5-dihydroxy-s-triazine as structurally depicted in (II);

b) cyclo-1,3 -(poly [1-hydroxyl-2,6-phenylene methylene)])-5-hydroxy-s-triazine or structurally depicted in (III);

c) (1-(phenoxy)-3-(phenoxy')-5-hydroxy-s-triazine-{poly [1-hydroxyl-(2,6-phenylene methylene)] as structurally depicted in (IV);

d) any oligomeric and monomeric permutation hitherto described.

Category II

Polymeric Repeating Units a) ladder polymers containing randomly interdispersed s-triazine 'steps' as structurally depicted in (V);

b) star polymers containing randomly interdispersed s-triazine connector sites for poly[1-hydroxyl-(2,6-phenylene methylene)] groups but where one or more pendant hydroxyl-s-triazine functions are also present as structurally depicted in (VI);

c) latter polymers containing randomly interdispersed s-triazine 'steps' and where oligomeric portions as described in the Oligomeric Category are also present;

d) star polymers containing randomly interdispersed s-triazine connector sites for poly[1-hydroxyl-(2,6-phenylene methylene)] groups and where oligomeric portions as described in the Oligomeric Category are also present;

e) any oligomeric and polymeric permutation heretofore described.

The structures indicated above (i.e., II through VI) are provided below:

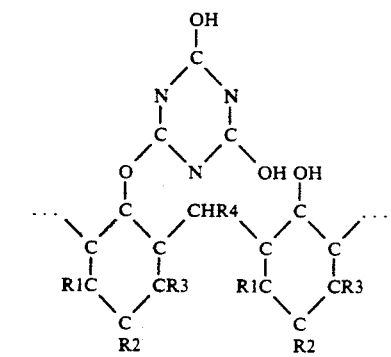
(II)

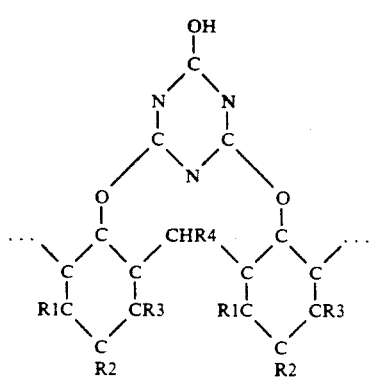
(III)

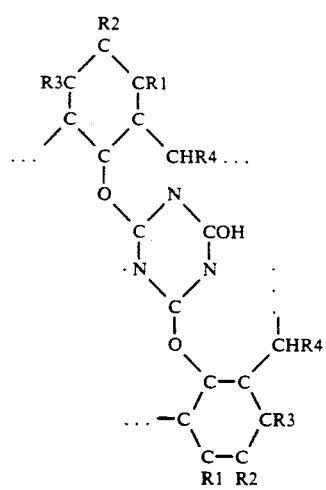
(IV)

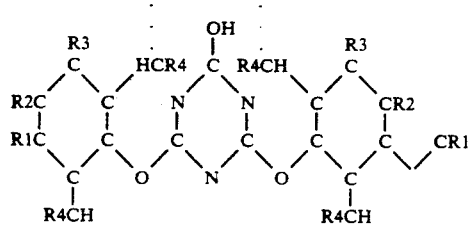
(V)

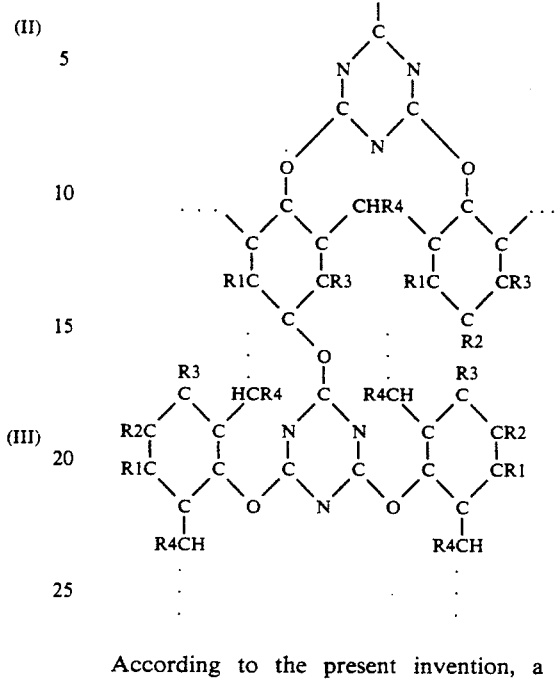
(VI)

According to the present invention, a chemical method has been developed to solubilize reducing agent precursors in diesel fuel and to enhance their overall thermal stability. Upon thermal decomposition or unzipping, the reducing agent precursors generate isocyanic acid, HNCO, generically depicted below in Equation (Eq.) 2.

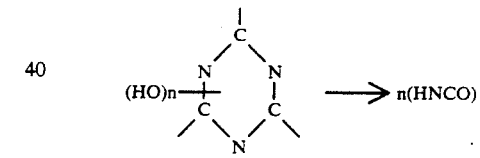

The reducing agent precursors are hydroxyl-s-triazines containing at least one hydroxyl function. The method of encapsulating hydroxyl-s-triazines using poly[1-hydroxyl-(2,6-phenylene methylene)] so that both dissolution in diesel fuel becomes possible and the thermal stability of the molecule is enhanced, consists of a process entailing:

a) reacting an hydroxyl-s-triazine containing at least hydroxyl group (VII); an hydroxyl-s-triazine containing a functionality which may chemically converted insitu into a hydroxyl group (VIII); or an hydroxyl-s-triazine containing both a hydroxyl group and another functionality which may be chemically converted insitu into a hydroxyl group (IX); and an alkaline salt of poly[1-hydroxyl-(2,6-phenylene methylene)] (X); and b) isolating said separating reaction product from impurities generated therefrom said process.

Chemical s-triazines amenable to this process may be selected from those depicted below by formulas VII, VIII and IX.

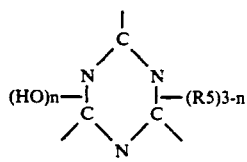
(VII)

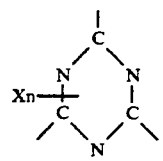
(VIII)

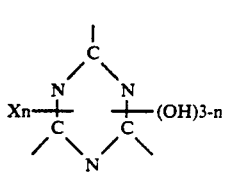
(IX)

In all cases (i.e., structures I–IX above and below, Equation 2 above and structure X below) the integer n varies from 1 to 3; $R_5$ is any inert non-reactive substituent. 'Non-reactive' shall mean non-reactive or inert to both the number of hydroyxl groups and to the chemical encapsulation process. It may be selected from the group consisting of C1 to C10 hydrocarbons that may be alkyl, aryl, linear or branched or saturated or unsaturated symbol. $R_1$ through $R_4$ are as defined below and (X) represents any of the Group VIIa elements, although for economical reasons, it is especially desirable to limit (X) to chlorine.

Poly[1-hydroxyl-(2,6-phenylene methylene)] amenable to the aforementioned process is shown below in structure (X).

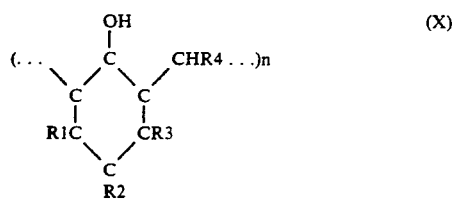
(X)

In all of the above structures (i.e., I–X), n represents the repeat unit of the oligomer. Its range may vary from 3 to 3000, but its most preferable range is from 3 to 10. R1, R2, and R3 are substituents designed to enhance both the solubility and thermal properties of the oligomer. They may be hydrogen or selected from the group of C1 through C50 hydrocarbons, including linear or branched alkyl, or cyclo-alkyl groups; aromatic or polyaromatic; alkylaromatic and alkylpolyaromatic; saturated or unsaturated. They may also contain one or more heteroatoms as either an appendage or as part of one or more ring, cyclic or aromatic, structure. R4 represents hydrogen or a C1 to C10 hydrocarbon. The hydrocarbon is ideally linear, but may also be branched; saturated or unsaturated; aromatic, polyaromatic, alkylaromatic, or alkylpolyaromatic.

The chemical method or process used to chemically encapsulate hydroxyl-s-triazines into poly[1-hydroxyl-(2,6-phenylene methylene)] is shown below in Equation (Eq.) 3.

For illustrative purposes only, Eq. 3 shows poly[1-hydroxyl(2,6-phenylene methylene)] reacting with and subsequently encapsulating trichloro-s-triazine which encapsulating is illustrated below in structures II, III and IV, where $R_1$ through $R_4$ are as defined above.

Eq. 3:

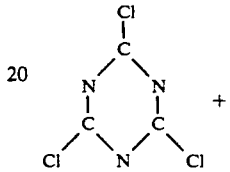 +

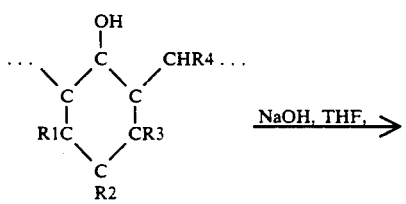 NaOH, THF,

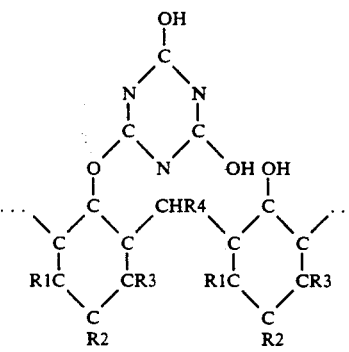
(II)

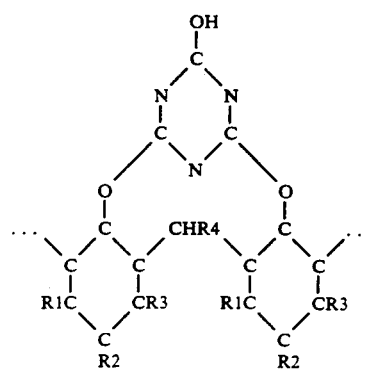
(III)

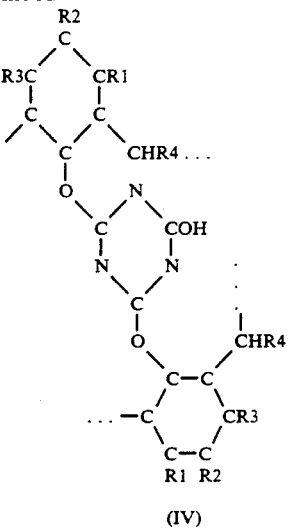

(IV)

In order to further illustrate the present invention and its advantages, the following examples are provided.

EXAMPLE I

Preparation of poly[1-hydroxyl-(2,6-phenylene methylene)]

Purified phenol, 94.0 g, was placed into a 500 ml resin reaction flask. The accompanying 4-neck flat flange top contained a vacuum stirrer with a 2" Teflon blade, thermometer with a vacuum seal, a three foot hollow reflux tube packed with 2½ feet of 3 mm glass beads, and a 125 ml cylindrical separatory funnel with a pressure equalizing arm. A 50 ml gas trap, packed with ice-cold brine, was attached to the reflux tube. The reaction flask was immersed in an oil bath and gently heated; once at 120° C., a suspension of Ca(OH)2, 0.282 g/5mls water, quickly added. Once the temperature reached 165° C.-170° C., a dropwise addition of 37 wt % formaldehyde solution in water, 27 g, commenced.

Strong heating continued to ensure the temperature remained within the aforementioned specifications and continued for about 4 to 5 hours. Fluid collected in the gas trap was routinely re-delivered into the kettle. At the conclusion of the reaction, the contents were distilled under vacuum and heated gently to remove unreacted formaldehyde and water. Strong heating followed to remove unreacted phenol and lower weight condensation products. The contents of the kettle were then dissolved into 1 liter ethanol containing 10 g NaOH; filtered; and precipitated in 3.0 liters of 10 wt % aqueous HCl; the process being repeated three times. The ultimate product, i.e., poly[1-hydroxyl-(2,6-phenylene-methylene)], was subsequently dissolved in 100 mls acetone and dried over anhydrous MgSO4; vacuumed stripped 24 hours later; and stored in a dedicator containing CaCl2 until needed.

EXAMPLE II

Preparation of poly[1-hydroxyl-(2,6-(p-methyl)-phenylen methylene)]

Purified cresol should be substituted for the phenol of Example I of this Example and the procedure set forth in Example I should be followed in this Example to obtain the product herein.

EXAMPLE III

Preparation of poly[1-hydroxyl-(2,6-(p-nonyl)-phenylene methylene)]

Purified nonylphenol should be substituted for the phenol of Example I in this Example and the procedure set forth in Example I should be followed in this Example to obtain the product herein.

EXAMPLE IV

Preparation of poly1-hydroxyl-(2,6-(p-phenyl)-phenylene methylene)]

Purified phenylphenol should be substituted for the phenol of Example I in this Example and the procedure set forth in Example I should be followed in this Example to obtain the product herein.

EXAMPLE V

Preparation of poly{(1-hydroxyl-(2,6-(p-methyl)-phenylene methylene)-co-(2,6-(p-phenyl)-phenylene methylene)]}

A 1:1 mole ratio of p-phenylphenol and p-cresol should be substituted for the phenol of Example I in this Example and the procedure set forth in Example I should be used in this Example to obtain the product herein.

EXAMPLE VI

Preparation of poly{(1-hydroxyl-2,6-(p-nonyl)-phenylene methylene)-co-(2,6-(p-phenyl)-phenylene methylene)]}

A 1:1 mole ratio of p-phenylphenol and p-nonylphenol should be substituted for the phenol of Example I in this Example and the procedure set forth in Example I should be used in this Example to obtain the product herein.

EXAMPLE VII

Oligomeric encapsulation of hydroxyl-s-triazine using poly[1-hydroxyl-(2,6-phenylene methylene)] and cyanuric trichloride Approximately 15 parts poly[1-hydroxyl-(2,6-phenylene methylene)] was dissolved in 200 parts xylene and sufficient NaOH added to convert 10% to 15% hydroxyl portion to the corresponding sodium phenoxide. Approximately 3 parts of cyanuric trichloride dissolved in 50 parts anhydrous THF was quickly added and the mixture heated to reflux for 2 hours. The mixture was cooled; filtered to remove sodium chloride; and the solvent removed by vacuum stripping to result in the encapsulation product herein.

EXAMPLE VIII

Oligomeric encapsulation of hydroxyl-s-triazine using poly[1-hydroxyl-(2,6-(p-nonyl)phenylene methylene)] and cyanuric trichloride Poly[1-hydroxyl-(2,6-(p-nonyl)phenylene methylene)] should be substituted for the poly[1-hydroxyl-2,6-phenylene methylene)] of Example VII in this Example and the procedure set forth in Example VII should be followed in this Example to obtain the encapsulation product herein.

EXAMPLE IX

Oligomeric encapsulation of hydroxyl-s-triazine using poly[1-hydroxyl-(2,6-(p-phenyl)phenylene methylene)] and cyanuric trichloride Poly[1-hydroxyl-(2,6-(p-phenyl)phenylenemethylene)] should be substituted for the poly [1-hydroxyl 2,6-phenylene methylene) of Example VII in this Example and the procedure set forth in Example VII should be used in this Example to obtain the encapsulation product herein.

EXAMPLE X

Oligomeric encapsulation of hydroxyl-s-triazine using poly{1-hydroxyl-[2,6-(p-nonyl)phenylene methylene]-co-[2,6-(p-phenyl)phenylene methylene]} and cyanuric trichloride Poly{1-hydroxyl-[2,6-(p-nonyl)phenylene methylene]-co-[2,6-(p-phenyl)-phenylene methylene]} should be substituted for the poly[1-hydroxyl 2,6-phenylene methylene] of Example VII in this Example and the procedure set forth in Example VII should be followed in this Example to obtain the encapsulation product herein.

TESTING AND EVALUATION

The materials synthesized according to the present invention and illustrated in the above Examples, were structurally and physically evaluated. The key structural property of interest was the detection of hydroxyl-s-triazines encapsulated within the oligomeric or polymer matrix. This evaluation was performed using Fourier Transform Infrared spectroscopy (FTIR). Results of FTIR studies are summarized below in Table I. Moreover, high pressure liquid chromatography was also performed to qualify the number of oligomeric materials present within each experimental sample. Results of this investigation and experimental separation parameters are summarized below in Table II.

Physical testing was concerned with the solubility of encapsulated samples in diesel fuel and thermal stability of the neat sample. Results of solubility studies involving both non- and encapsulated materials are summarized below in Table III. Thermal stability studies were performed using Thermal Gravimetric Analysis (TGA) designed to mimic an internal engine combustion event. This was achieved by utilizing a heating rate of 200 deg C/min. TGA summaries of selected samples are provided below in Table IV.

TABLE I

Detection Of Encapsulated Hydroxyl-s-Triazine Within An Oligomeric Matrix

| Sample | Phenolic OH Stretch (cm-1) | Phenolic OH Deformation (cm-1) | Cyanuric Acid OH Stretch (cm-1) | Cyanuric Acid OH Deformation (cm-1) |
|---|---|---|---|---|
| Cyanuric Acid | — | — | 3203 | 1390 |
| Example VII | 3419, 3065 3022 | 1216 | 3203 | 1380 |
| Example VIII | 3462, 3081 3016 | 1233 | 3204 | 1380 |
| Example IX | 3465, 3087 3050 | 1237 | 3203 | 1381 |
| Example X | 3478, 3030 3004 | 1222 | 3200 | 1382 |

All FTIR evaluations for experimental samples from each of Examples VII, VIII, IX and X were obtained using films produced using THF as the solvent and NaCl discs. FTIR analysis for cyanuric acid was performed by suspending in Nyjol mineral oil.

TABLE II

Summary Of Peak Detection Of Experimental Samples Using HPLC
The column used for the analysis was non-polar (C18; HS-3 C1) reverse phase using a sample concentration of 16.0 mg/10 mls THF. The injection volume was routinely 20 microliters and a detection wavelength was 250 nm was used for all samples from Examples VII, VIII, IX and X.

| Sample Mixture | Components Detected |
|---|---|
| Example VII | 6 |
| Example VIII | 6 |
| Example IX | 3 |
| Example X | 3 |

TABLE III

Maximum Solubility Of Encapsulated Hydroxyl-s-Triazines In Poly[1-Hydroxyl-(2, 6-Phenylene Methylene)] Derivatives In Diesel Fuel

| Sample | Solute Concentration at Turbidity Point |
|---|---|
| Example VII | 1.5 |
| Example VIII | 10 |
| Example IX | >0.5 |
| Example X | 20 |

TABLE IV

Thermal Decomposition Of Experimental Precursors And Encapsulated Hydroxyl-s-Triazines Using A Heating Rate Of 200 Deg C/min Under Nitrogen

| Sample | 50 wt % Decomposition Temp. (deg C) | 90 wt. % Loss Decomposition Temp. (deg. C) |
|---|---|---|
| Example VII | 490 | 660 |
| Example VIII | 565 | 785 |
| Example IX | 665 | <920 |
| Example X | 570 | <920 |

It is readily apparent from both the structural and physical characterization given above that a new composition of matter has been founded, namely, encapsulated hydroxyl-s-triazines that exhibit unique and novel properties.

We claim:
1. A composition of matter comprising a mixture of:
   a) 1-(poly[1-hydroxyl-(2,6-phenylene methylene)])-3,5-dihydroxy-s-triazine;
   b) cyclo-1,3-(poly[1-hydroxyl-2,6-phenylenemethylene)])-5-hydroxy-s-triazine;
   c) {1-(phenoxy)-3-(phenoxy')-5-hydroxy-s-triazine-}poly[1-hydroxyl-(2,6-phenylene methylene)];
   d) a ladder polymer containing randomly interdispersed s-triazine 'steps'; and
   e) a star polymer containing randomly interdispersed s-triazine connector sites for poly[1-hydroxyl-(2,6-phenylene methylene)] groups but where one or more pendant hydroxyl-s-triazine functions are also present.

2. The composition of matter of claim 1, wherein the components are represented, respectively, by the formulas

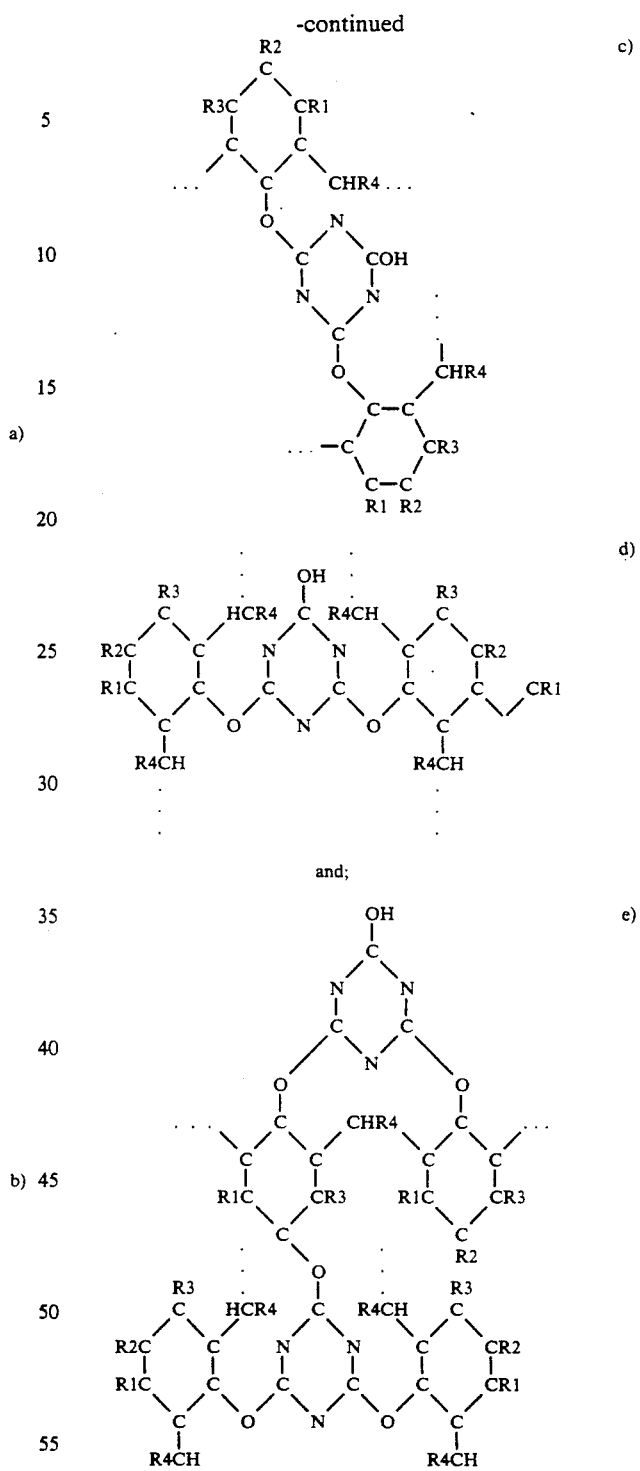
wherein the integer n varies from 3-3000; $R_1$, $R_2$, and $R_3$ are each H or a ($C_1$-$C_{50}$) linear or branched alkyl, aromatic, polyaromatic, alkylaromatic, alkylpolyaromatic, unsaturated or saturated hydrocarbon group; $R_4$ and $R_5$ are each a ($C_1$-$C_{10}$) hydrocarbon group as defined for $R_1$, $R_2$ and $R_3$.
* * * * *